March 8, 1966     J. D. HALE     3,238,916

INDICATOR MECHANISM FOR SCALES

Filed May 15, 1963     4 Sheets-Sheet 1

INVENTOR.
JOHN D. HALE
BY *George A. Woodruff*

March 8, 1966  J. D. HALE  3,238,916
INDICATOR MECHANISM FOR SCALES

Filed May 15, 1963  4 Sheets-Sheet 2

INVENTOR.
JOHN D. HALE
BY George A. Woodruff

March 8, 1966      J. D. HALE      3,238,916

INDICATOR MECHANISM FOR SCALES

Filed May 15, 1963      4 Sheets-Sheet 3

*INVENTOR.*
JOHN D. HALE

BY *George A. Woodruff*

March 8, 1966  J. D. HALE  3,238,916
INDICATOR MECHANISM FOR SCALES
Filed May 15, 1963  4 Sheets-Sheet 4

INVENTOR.
JOHN D. HALE
BY George A. Woodruff

United States Patent Office 3,238,916
Patented Mar. 8, 1966

3,238,916
INDICATOR MECHANISM FOR SCALES
John D. Hale, St. Johnsbury, Vt., assignor, by mesne assignments, to Fairbanks Morse Inc, New York, N.Y., a corporation of Delaware
Filed May 15, 1963, Ser. No. 280,666
12 Claims. (Cl. 116—129)

This invention relates to indicator mechanism for weighing apparatus and the like, and has particular reference to improved indicator mechanism for affording tare and net weight indications, in addition to gross weight indications.

An object of the invention resides in the provision for weighing apparatus having dial means including a main dial indicator positionable according to the weight measuring function of the apparatus, and improved auxiliary dial indicator means providing tare and net weight indications in use of the weighing apparatus in processes such as for example, drum or container weighing and filling operations.

Another object is to afford auxiliary dial indicator mechanism which is selectively controllable for indicating operation conjointly with the main indicator, and for return of the auxiliary indicator to the initial or dial zero position and retention thereof in such zero position independently of weighing apparatus operation of the main indicator.

Another object is to provide relatively simple and inexpensive yet highly effective auxiliary indicator means for the purpose indicated, which is of such improved character as to greatly minimize or avoid frictional drag upon, and adverse loading of, the dial shaft, thereby avoiding adverse effects upon the sensitivity and response of the weighing apparatus.

A further object is to provide auxiliary indicator means as aforesaid, which is of pneumatically operated, explosion-proof character highly suitable for application to dial type weighing apparatus intended for use in areas subject to fire and explosion hazards, as in container weighing and filling operations involving flammable volatile fluids, chemicals and the like.

Yet another object is to provide improved auxiliary indicator means as aforesaid, embodying means actuable thereby for effecting a control function, as for controlling material feed in container filling operations of the weighing apparatus.

The foregoing objects and other advantages of the present improvements will appear hereinafter in connection with the description of presently preferred embodiments illustrated in the accompanying drawing, wherein.

Figure 1:
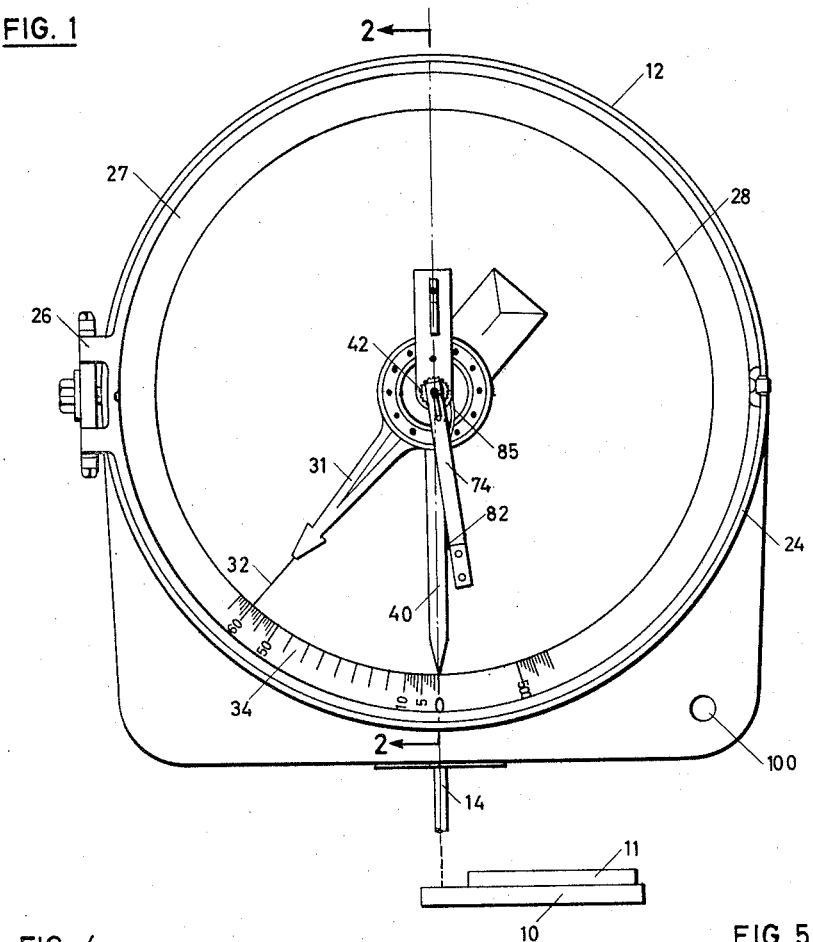
FIG. 1 is a front elevation of a scale dial head embodying improvements according to the present invention.
Figure 2:
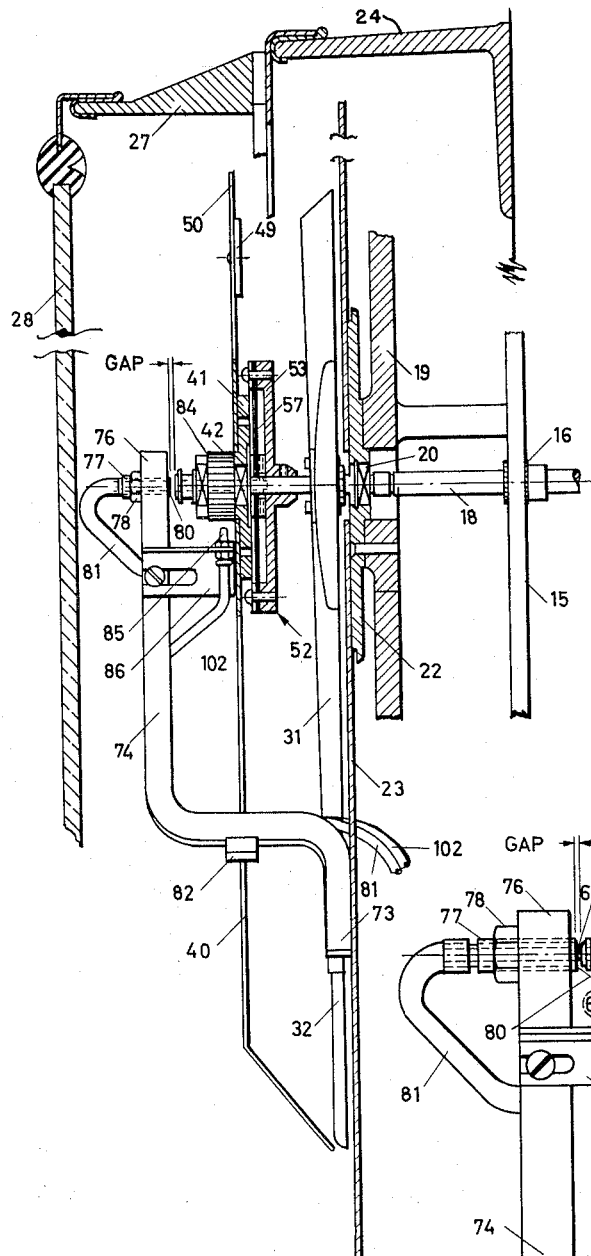
FIG. 2 is an enlarged, fragmentary sectional view of the dial head, as taken from line 2—2 in FIG. 1, but showing the dial pointers at zero scale position.
Figure 3:
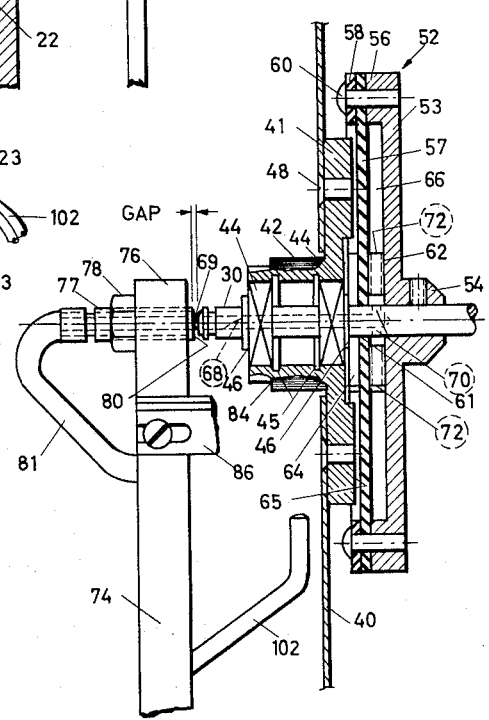
FIG. 3 is a sectional view similar to that of FIG. 2, but enlarged thereover and with parts omitted, to better illustrate certain details of the invention.

Referring first to FIGS. 1, 2 and 3 of the drawing, there is shown diagrammatically a platform type weighing scale including base 10 and weigh platform 11. The scale dial head 12 (appearing in enlarged view) may be supported on the scale base 10 through the usual column (not shown) through which extends the usual steelyard rod 14 to operative connection with the platform lever system (not shown) in base 10. Rod 14 is operatively associated with counterweight or pendulum mechanism (not shown) contained in the dial head 12, and is drivingly connected in suitable manner (not shown) to a rack bar 15 (see FIG. 2). Rack 15 engages the driven pinion 16 on the dial shaft 18, for causing shaft turning in response to weight measuring operation of the scale.

The dial head internal frame shown partly at 19, rotatably supports the shaft 18 as in suitable anti-friction type bearings, one of which appears at 20 carried in frame part 22 which supports the dial chart disc 23. A deep sash enclosure portion 24 of the dial head 12 extends forwardly as shown in FIG. 2, and to the sash is hinged as at 26 a front cover 27 including transparent panel or front glass 28. Shaft 18 provides a projecting portion 30 extending forwardly toward front glass 28, and fixed on the shaft portion thereof adjacent dial chart 23 is a main dial indicator or pointer 31. The tip end portion 32 of pointer 31 cooperates with the graduated weight indicia scale 34 on the dial chart 23, the initial or zero indicia point of the scale being at the bottom of the chart as here shown (FIG. 1).

In accordance with the present invention, there is provided an auxiliary dial indicator or pointer 40 coaxial with main pointer 31, and clutch means for selective connection of the auxiliary pointer to the dial shaft 18 for operation thereby. Referring particularly to FIGS. 2 and 3, a clutch element 41 in the form of a disc, includes an axially projecting circular hub 42 through which the element is freely rotatably supported on the projecting portion 30 of shaft 18, as by a pair of anti-friction bearings 44. Hub collars 45 (FIG. 3) and shaft collars 46 serve to retain the bearings and hub of the clutch element against displacement axially of the shaft. Auxiliary pointer 40 is carried by the clutch element against the outer face of the disc to which it is secured as by suitable screws 48. Balance of pointer 40 may be attained through positional adjustment of the balance weight 49 on the pointer tail portion 50.

Associated with clutch element 41 is a fluid pressure or pneumatically operated clutching assembly 52. The assembly provides a disc form housing member 53 having a hub 54 mounted on and suitably secured to the shaft portion 30, and including a peripheral, axially projecting flange 56. Seated against the annular face of flange 56 is the peripheral portion of a diaphragm member 57 formed of suitable flexible, resilient material, as rubber or the like. The diaphragm is held or clamped in fluid-tight mounting on flange 56 as by an annular clamping ring 58 secured to the flange by screws 60. Further, the diaphragm hub 61 at its center opening receiving the shaft portion 30 therethrough, sealingly embraces the shaft in position axially spaced from the hub portion of housing member 53 by a spacing collar 62 secured to housing member 53 in suitable manner (not shown). On the shaft externally against the diaphragm hub 61 is a spacer washer 64 which in the assembly position of the housing member 53 on shaft portion 30, abuts the adjacent one of the shaft collars 46 and thereby determines the clutch disengaged spacing of the diaphragm from the cooperating clutch face 65 of clutch element 41.

Thus the housing member 53 and diaphragm 57 define a chamber 66 in the assembly 52, to which fluid, as air under suitable pressure, is admitted by means to be described, for causing outward deflection or expansion of the diaphragm to frictional clutching engagement with the clutch face 65 of clutch element 41. When so engaged, the auxiliary pointer 40 is thereby in driven connection with the shaft 18. Upon release of air pressure in chamber 66, the diaphragm immediately returns to its unstressed, de-clutching position shown in FIGS. 2 and 3.

Referring now to the means for supplying air pressure to chamber 66, the portion 30 of shaft 18 is axially bored to provide air passage 68 axially open at port 69 in the outer end of the shaft portion, and terminating within the shaft in one or more radial passages 70 opening to the shaft periphery substantially in line with the collar 62. One or more radial passages 72 in collar 62 provide communication between the chamber 66 and shaft passages 70, the collar having its shaft bore appreciably larger in diameter than the diameter of the underlying shaft portion to facilitate such communication.

Suitably mounted on the face of dial chart disc 23 in the sector thereof between the zero and capacity indicia graduations (FIG. 1), is the base 73 of a bracket 74, the bracket terminating in end portion 76 opposed to and outwardly spaced from the outer end of shaft portion 30. Supported in bracket end 76 is a nozzle element 77 in axial alignment with the shaft passage 68, a clamping nut 78 being provided for adjustable securement of the nozzle with its discharge tip 80 in predetermined desired close spacing from the shaft passage port 69. The nozzle tip spacing from the shaft end and port 69 is such as to assure avoidance of shaft contact with the nozzle tip in scale indicator operation, and yet afford a minimum air gap clearance therebetween to minimize pressure air loss at the gap in nozzle supply of air across the gap and through the passages 68, 70, and 72 to clutch chamber 66. Such minimum gap clearance permits the use of relatively low pressure air in supply to the nozzle, with attainment of sufficient air pressure in chamber 66 to effect full clutching actuation of the clutch diaphragm 57. For example, air pressure of about 10 p.s.i. at the nozzle is found to be sufficient to assure clutch operation, where the nozzle to shaft gap is in the range of .010 to .015 inch. Supply of air to the nozzle is made through a suitable flexible conduit or hose 81 supported by the bracket 74 and connected to supply control means presently to appear. It is to be noted that in the absence of pressure air delivery at nozzle 77, the nozzle to shaft gap functions as a vent for clutch chamber 66 to relieve air pressure therein and permit return of the clutch diaphragm to de-clutched position.

Carried by the bracket 74 is a zero stop abutment 82 disposed in the path of movement of the auxiliary pointer 40 for engagement thereby in the exact zero scale position of the pointer (FIG. 1). The present invention includes fluid pressure or pneumatic motor means operable selectively as will hereinafter appear, for returning the auxiliary pointer to such zero position and retaining it in engaged position with the zero stop 82. The motor means in the present embodiment includes the clutch disc hub 42 which is knurled or serrated to provide uniformly spaced, axially extending blade-like elements 84 about the hub. Operatively associated with the hub is a fluid pressure delivery nozzle 85, the nozzle being adjustably supported by an arm 86 on bracket 74 such that it is suitably adjacent the hub in position to direct fluid, as air under suitable pressure, generally tangentially of the hub against the hub-blade elements 84. Thus the nozzle and bladed hub form a fluid motor or turbine wherein the nozzle relation to the hub blades as viewed in FIG. 1, is such as to result upon nozzle delivery of fluid pressure and when the hub is free to turn, in counter-clockwise rotation of the hub to bring the auxiliary pointer to zero scale position against stop 82. Continued motor energization will retain or hold the auxiliary pointer at the zero position.

Figure 4:
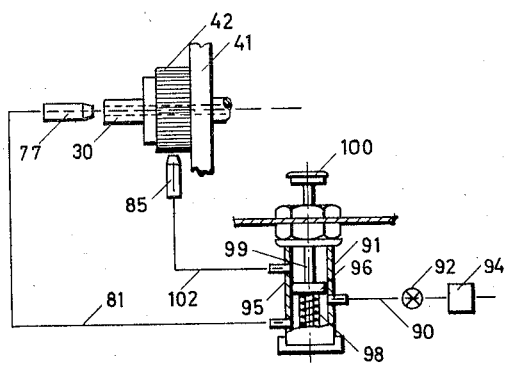
FIG. 4 is a diagrammatic view of one form of pressure delivery nozzle and control valve system embodied in the improved apparatus.

FIG. 4 illustrates in schematic manner, one form or arrangement of controlled pressure supply to the nozzles 77 and 85. Pressure fluid as compressed air is supplied from a suitable source (not shown), over line 90 to the inlet connection of a two-way control valve 91. The line includes shut-off valve 92, and a pressure-reducing device 94 which may be adjusted to determine the pressure of air in supply to the valve 91 as at about 10 p.s.i. in the present example. Valve 91 includes cylinder 95 having a valve piston 96 slidable therein and urged to an initial position by a suitable spring 98, and a piston operating rod 99 projecting externally of the cylinder and having a manual operator or push button 100. Location of valve 91 in the dial head 12 is such as to expose the push-button 100 accessibly at the exterior of the dial head casing, as this appears in FIG. 1.

Extending from one end of the valve cylinder is the heretofore mentioned conduit 81 which leads to connection with the clutch nozzle 77, while from the opposite end portion of the cylinder extends a conduit or flexible hose 102 which connects with the motor nozzle 85. It will be observed that when the valve piston 96 occupies its initial position, air pressure in supply to the valve cylinder will pass to the line or conduit 81, and thence by nozzle 77 to the indicator shaft passage for effecting clutch operation to connect the auxiliary dial pointer to the indicator shaft. In such condition, the piston prevents air supply to motor nozzle 85, so that the motor is then inactive. Operating the push-button 100 to locate valve piston 96 on the other side of the cylinder supply inlet, results in pressure delivery to the nozzle 85 with consequent motor operation in the direction to locate and retain the auxiliary pointer at scale zero. This operation also results in air cut-off to the clutch nozzle 77, with consequent immediate disengagement of the clutch as permitted by pressure air vent from the clutch chamber 66 to atmosphere through the nozzle-shaft gap (FIG. 2).

The now described indicator mechanism according to FIGS. 1 to 4 is capable of a number of different operations, as will be apparent to those skilled in the art. Several examples may be here noted, the most obvious being simple gross weight operation. In this case, and with both pointers 31 and 40 at scale zero, weighing operations may proceed with weight indication solely by the main pointer 31 where the auxiliary pointer is inactive, as by retaining the shut-off valve 92 closed. If desired, the valve 92 may be opened and so long as the control valve 91 remains in its initial condition as shown in FIG. 4, the auxiliary pointer 40 will be clutched to the dial shaft for conjoint movement with the main pointer.

Where taring and net weight indication is desired, as in container filling operations for example, the tare weight of an empty container on the scale platform will be indicated by main pointer 31. With the control valve 91 then in initial condition supplying air pressure to the clutch, the auxiliary pointer 40 moves with the main pointer to the tare weight point on the dial scale. Now having tare weight indication, the control valve button 100 is pushed to reverse the control valve and supply air pressure to motor nozzle 85. Pressure air thus directed by the nozzle tangentially against the knurled surface of clutch hub 42, results in turbine action producing return of the auxiliary pointer 40 to scale zero where it will remain under motor bias until the control valve button 100 is released. Normally only momentary actuation of the button 100 will be sufficient for zero return of the pointer 40. Release of button 100 returns the control valve to initial condition, supplying pressure air to the clutch and thereby connecting the auxiliary pointer 40 for movement by the indicator shaft along with pointer 31. On filling the container, both pointers move up-scale and when the desired amount of material has been admitted, the auxiliary pointer 40 then indicates the net weight (weight of material in the container) while the main pointer indicates gross weight (material and container). Upon removing the filled container from the scale platform, the button 100 is again pushed to cause de-clutching of the auxiliary pointer and motor return thereof to scale zero. The button is held in until the main pointer attains scale zero position, whereupon release of the button restores the shaft clutched condition of the auxiliary pointer, with both pointers then at scale zero and ready for the next weighing operation.

Figure 5:
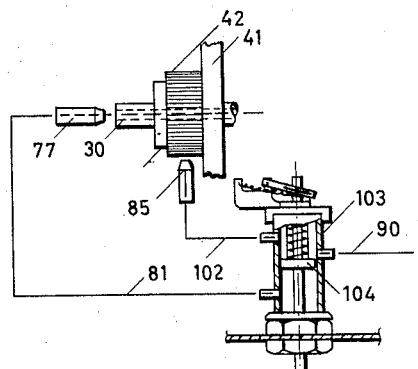
FIG. 5 is a diagrammatic view of a modified form of the nozzle and control valve system.

FIG. 5 illustrates a modified nozzle air supply control arrangement, employing a two-position toggle type control valve 103 in place of the control valve 91 of FIG. 4. In this modification, the initial position of the valve piston 104 wherein the control button 100a is extended as viewed in the figure, is such as to direct pressure air supply over conduit 102 to the air motor nozzle 85, thereby establishing motor operation to retain the auxiliary pointer 40 at scale zero. So long as the button 100a is not pushed in, the auxiliary pointer will remain at scale zero (under air motor bias) independently of weighing operations utilizing only weight indications by the main pointer 31. When, however, the button is pushed in to reverse the control valve, the piston 104 then is positioned to direct air pressure supply over conduit 81 to clutch nozzle 77, which results in clutching of the auxiliary pointer to the indicator shaft for conjoint movement with the main pointer. This condition will remain because of the toggle type valve, until the button 100a is pulled out to initial extended position.

Thus and for example, in a container filling operation and with the control valve button 100a extended (initial condition), the tare weight of the empty container will be shown by the main pointer 31, while the auxiliary pointer 40 remains at scale zero. Thereupon the button 100a is pushed in to reverse the control valve and cause clutch engagement, when the indicator mechanism will be conditioned for the container filling operation. At completion of that operation, the main pointer indicates the gross weight while the auxiliary pointer shows net weight. Thereafter on removal of the filled container from the scale platform, the control valve button 100a is pulled out to restore the valve to initial condition, thereby causing air motor return of the auxiliary pointer to scale zero independently of the main pointer in its return to scale zero.

It will be apparent from the foregoing, that the control valve 91 of FIG. 4 or the control valve 103 of FIG. 5 may be operated automatically from any suitable point away from or remotely relative to the scale dial head. Although not herein illustrated, such remote operation could be accomplished through known forms of mechanical, electrical or fluid pressure controls, as may be desired.

Referring now to FIGS. 6 to 9, there is shown a presently preferred adaptation of the indicator mechanism of FIGS. 1 to 3, to automatic cut-off operation suitable in particular for container filling operations. In these views, all parts of the indicator mechanism which remain unchanged from the corresponding parts shown and described in respect to FIGS. 1 to 3, are here given the same reference numerals.

Figure 6:
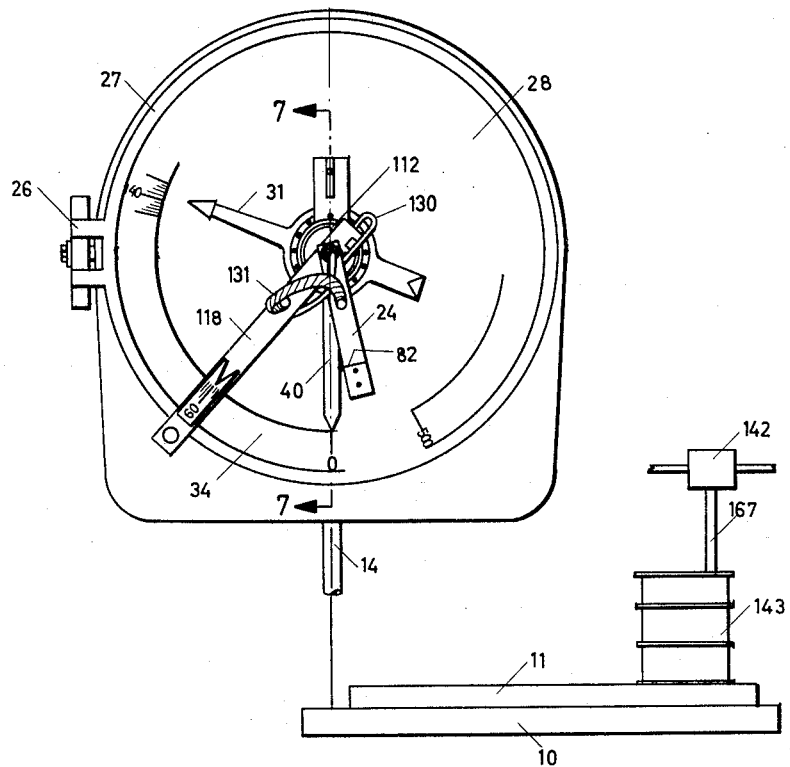
FIG. 6 is a front elevation of a scale dial head similar to the view of FIG. 1, showing additional features of the invention.

Arranged coaxially of the indicator shaft 18 and suitably secured to the auxiliary pointer clutch hub 42, is a cut-off control cam 110 having a circular peripheral surface 111 and a single recess or notch 112 therein. The mounted position of the cam preferably is such that in respect to the up-scale direction of auxiliary pointer movement from scale zero position as viewed in FIG. 6, the trailing side 114 of the cam notch is substantially coincident with the longitudinal axis of the auxiliary pointer. Rotatably journalled on portion 30 of shaft 18 adjacent the cam 110, effected through anti-friction bearing 115, is the inner end portion 116 of a cut-off indicator arm 118. The arm 118 extends radially from the shaft in a plane parallel to the plane of rotation of the auxiliary pointer, and carries at its outer end a suitable spring type screw clamp 119 clampingly engageable with the inner circular margin 120 of a flange member 122 carried by the dial head sash portion 24. Thus the arm may be angularly moved to any point over the dial face and retained thereat by the clamp. Further, arm 118 is provided with an aperture 123 through which the dial weight indicia is observable, and a pointer element 124 exposed by the aperture so that the pointer may be registered with a desired weight indicia value in desired angular location of the arm. As shown in FIG. 6, the arm is positioned with its pointer in register with the scale indicia 60, which may be or represent 60 pounds.

On the inner end 116 of arm 118 is a bracket element 126 which supports an air bleed nozzle 127. The bracket positions the bleed nozzle 127 such that its longitudinal axis parallels the longitudinal axis of the arm, and such that the nozzle is radial to the cam 110 and has its discharge tip 128 overlying the circular periphery 111 of the cam with predetermined minimum spacing or clearance relative thereto.

Figure 8:
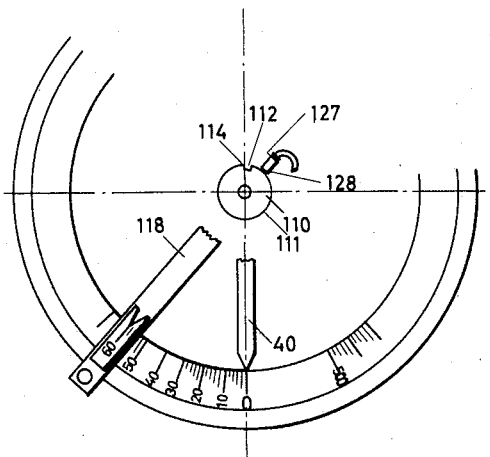
FIG. 8 is a front elevational view similar to that of FIG. 6, but in fragmentary part and with parts omitted whereby to better illustrate the cam and nozzle cut-off control of the embodiment according to FIG. 6.

As illustrated in FIG. 8, where the auxiliary pointer is at scale zero and the cut-off arm 118 is aligned with the 60 pound graduation of the dial scale, it is apparent that the cam notch 112 will come to and be exposed beneath the nozzle tip 128 only upon angular displacement of the auxiliary pointer to the 60 pound scale graduation. Thus, so long as the cam has any portion of its peripheral surface 111 opposed to the nozzle tip 128, nozzle air discharge will be very materially restricted by reason of the minimum clearance. When, however, the cam is turned to bring its notch 112 under the nozzle tip, the notch relieves the nozzle for substantially full air discharge. The function of the nozzle and cam will appear hereinafter from description of the control system shown in FIG. 9.

Figure 7:
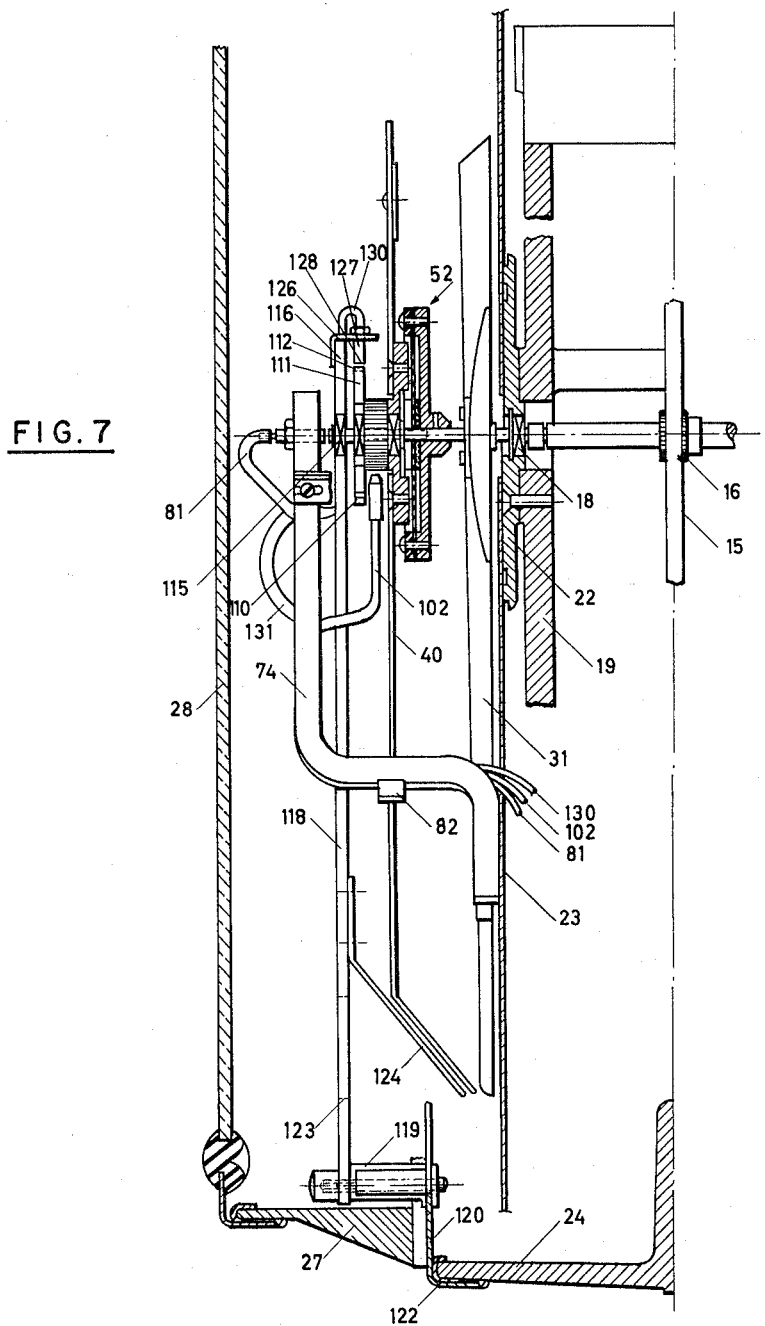
FIG. 7 is an enlarged, fragmentary sectional view of the dial head, as taken from line 7—7 in FIG. 6, but showing the dial pointers and cut-off indicator element at zero scale positions.

As shown in FIGS. 6 and 7, the nozzle 127 is supplied with pressure air over a flexible conduit 130. The conduit extends from support on the cut-off arm 118 through a loop 131 to support on fixed bracket 74, and thence to an air supply conduit presently to be described. Loop 131 located as shown, has a length sufficient to accommodate angular movement of the cut-off arm 118 to any desired point on the dial between the zero and maximum capacity indicia thereon.

Figure 9:
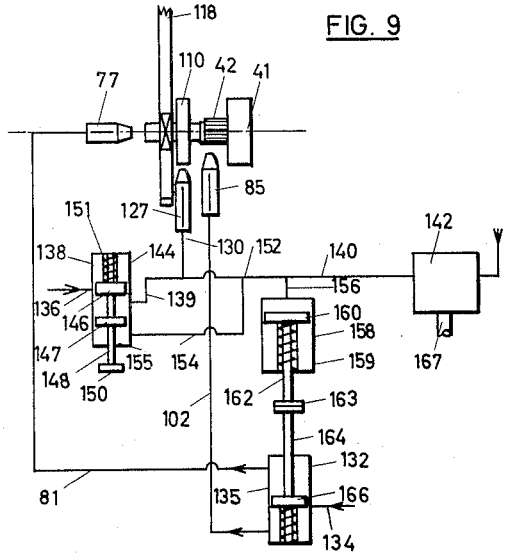
FIG. 9 is a diagrammatic view of the pressure delivery nozzle and control system for the embodiment according to FIGS. 6, 7 and 8.

Referring to FIG. 9 which is a schematic of the indicator mechanism and control system therefor and for the container-filling cut-off provision, a two-position piston type control valve 132 is provided for controlling air pressure supply to the auxiliary pointer clutch nozzle 77 and the air motor nozzle 85. Pressure air at about 10 p.s.i. is admitted at 134 to the valve casing 135, while the supply line 81 to nozzle 77 extends from the upper end of the casing, and supply line 102 to nozzle 85 extends from the lower end of the casing 135. The control valve in its initial (spring biased) condition shown, supplies pressure air to nozzle 85 for motor operation to locate and retain the auxiliary pointer 40 at scale zero (FIG. 6).

Air at a pressure of about 20 p.s.i. is supplied to the inlet 136 of a control valve 138, the outlet 139 of the valve being connected by delivery line 140 to a material feed valve 142. The feed valve is suitably disposed relative to the scale platform 11 for ready connection to a container to be filled, such as the drum 143 on the scale platform (FIG. 6). Valve 138 is illustrated as a slide valve of double piston type, providing a casing 144 in which the spaced valve pistons 146 and 147 slide. The pistons are on push rod 148 which terminates externally of the casing in a push button 150. Valve 138 is biased as by spring 151 to a normally closed condition wherein the pressure air inlet 136 is covered by the valve piston 146, and has its outlet 139 open to the casing space between the valve pistons. Connected to delivery line 140 at a suitable point 152 thereof, is branch line 154 leading to valve casing chamber 155 between the piston 147 and the push button end of the casing. Once the valve is opened by depression of the push button 150, pressure air from line 140 passes over branch 154 to valve chamber 155, where it acts on valve piston 147 to retain the valve open until pressure air is released from the branch line in a manner presently to appear.

The air supply conduit 130 leading to the nozzle 127 associated with the cut-off cam 110, is connected to line 140 at a point thereof between the control valve outlet 139 and branch line point 152. A further branch line 156 from delivery line 140 at a point thereof beyond point 152, leads to cylinder 158 of a piston type air relay or motor 159. The piston 160 of this motor has its rod 162 coupled as at 163 to the rod 164 of the valve piston 166 in control valve 132.

In operation of the mechanism according to FIGS. 6 to 9, an initial condition thereof is established before container weighing and filling, wherein the control valve 138 is closed, and air pressure is relieved from line 140 through the nozzle 127 then serving as a vent to assure no more than atmospheric pressure in the line. Pressure air at about 10 p.s.i. is then supplied to the control valve 132 which then in its initial condition (the air relay motor 159 being non-actuated in the absence of air pressure in line 140), passes pressure air to the air motor nozzle 85 causing motor operation to determine zero scale position of the auxiliary pointer 40 (FIG. 6). Now the cut-off arm 118 is turned to a position indicating the desired weight of material to be placed in the container, as drum 143. In FIG. 6 the arm is shown by way of example, at the 60 pound scale position, wherein the nozzle 27 and cam 110 are related as illustrated in FIG. 8.

When the mechanism is thus conditioned, the drum 143 is placed on the scale platform 11 and connected as by a flexible or other conduit member 167, to the feed valve 142. The drum then empty, presents tare weight which is shown by the main pointer 31 in scale actuation, the pointer here indicating in the view of FIG. 6 a drum tare of about 142½ pounds. The scale system is now ready for drum filling to the desired cut-off weight according to the position of cut-off arm 118.

Upon push-in of button 150 to open valve 138, pressure air is delivered over line 140 to nozzle 127, to valve chamber 155 (to hold the valve 138 open), to air relay motor 159, and to feed valve 142. In the present example, the capacity of air bleed nozzle 127 is such that when air discharge therefrom is substantially unrestricted (as when the cam notch 112 is opposed to the bleed nozzle tip), the supply air pressure at valve 142 and motor 159 is insufficient to operate these devices. However, so long as the bleed nozzle is opposed by the cam surface 111 which affords the heretofore indicated minimum clearance restriction of the nozzle, the resulting minimum air bleed is insufficient to reduce the net air pressure at feed valve 142 and motor 159 below that required to operate them. Also, air motor 159 is adapted to respond to a somewhat lower air pressure than that necessary to cause opening of the feed valve 142, so that on opening of supply valve 138, the motor operates ahead of feed valve opening. This is necessary in order that the motor may operate before any material is fed into the drum, to reverse the control valve 132 and thereby supply pressure air to the clutch nozzle 77 with resultant clutch operation to connect the auxiliary pointer 40 to the scale indicator shaft.

Now with feed valve 142 open and delivering material into the drum, the increasing weight of material in the drum is reflected in conjoint upscale movement of the main pointer 31 and auxiliary pointer 40. As the auxiliary pointer approaches and attains the cut-off setting of arm 118 (60 pounds as viewed in FIG. 6), cam 110 moving with the pointer, enters an angular position wherein its notch 112 registers with the bleed nozzle tip 128. The notch then removes nozzle bleed restriction, the resulting substantially full air bleed at nozzle 127 reducing the air pressure at feed valve 142 and motor 159 below that required to maintain them in pressure actuated condition. Consequently, the feed valve closes and terminates further feed of material to the drum, while the relay motor piston 160 returns to initial position, under its spring bias. Piston 160 in return movement, reverses the control valve 132 so that air pressure is cut off from clutch nozzle 77 (causing de-clutching of the auxiliary pointer from the indicator shaft) and is applied to air motor nozzle 85. The then energized air motor returns the auxiliary pointer to scale zero position. Coincidentally with the foregoing, bleed nozzle release of air pressure in line 140 is reflected in air pressure release from chamber 155 of valve 138, so that this valve immediately closes and cuts off pressure air supply to line 140.

At completion of the filling operation, the main pointer 31 indicates gross weight, while the net weight is that preset by the cut-off arm 118, the auxiliary pointer in this case serving through its clutched connection to the indicator shaft, to bring the cam 110 into notch association with the bleed nozzle at the cut-off point set by arm 118. Upon removal of the filled drum 143 from the scale platform, the main pointer 31 returns to scale zero, and the mechanism is then ready for the next weighing and filling operation. Obviously, in any succeeding operation where a given container is to be filled to a desired material weight differing from the previous weight setting, the operator need only re-adjust the cut-off arm 118 to the desired weight indicia point on the scale dial. Also, it is to be noted that in successive filling of containers, variation in container tare weights is automatically accounted for, with the tare of each container indicated by the main pointer 31.

It will be appreciated now that the presently improved indicator mechanism according to the embodiment shown by FIGS. 1 to 3, or the embodiment including the cut-off provision as exhibited in FIGS. 6 to 8, is well suited for weighing apparatus employed under hazardous conditions, as for example in the filling of containers with volatile fluids of flammable or explosive nature. The use of pressure air only, in the mechanism control systems such as illustrated in FIGS. 4, 5 and 9, avoids the hazards of fire and explosion which would attend the employment of electrically operated controls. Moreover, the present embodiments of the invention are capable of use in a wide variety of weighing operations. For example, where a number of different materials each to desired net weight are to be placed in one container, the indicator mechanism of FIGS. 1 to 3 with the control circuit of FIG. 5 would be operated as follows: With the empty container on the scale platform, the main pointer 31 will indicate the container tare weight. Now with the control valve 103 operated to effect clutching of the auxiliary pointer 40 to the indicator shaft, material A is placed in the container to the desired net weight as shown by the auxiliary pointer. auxiliary pointer to scale zero, after which material B is placed in the container to a desired net weight shown by the auxiliary pointer. Repeating for a last material C, the main pointer 31 then will show the gross weight of the container and materials A, B and C therein.

The mechanism of FIGS. 1 to 3 with the control system as shown by FIG. 5 may be utilized equally as well, in a weighing-out operation, as where amounts of material are removed from a container in succession, each to a desired net weight. In such instance, the air motor nozzle 127 would be re-located relative to the hub 42 such that when energized, it will drive the auxiliary pointer to the capacity indicia of the scale dial (against a stop at that point). Upon placing the full container on the scale platform, the main pointer will show the gross weight (including container tare). Now, the control valve 103 then operated to supply air to air motor nozzle 127 for causing motor positioning of the auxiliary pointer 40 at dial capacity, is reversed to clutch the auxiliary pointer to the indicator shaft, whereupon the mechanism is ready for material removal.

As a first amount of material is removed from the container, the auxiliary pointer moves down scale. Assume for example that the dial capacity is 500 pounds, and the net weight of material desired to be removed is in this first case, 40 pounds. Thus when the auxiliary pointer attains the 460 pound scale indicia, it indicates that the desired net weight of the material has been removed. Thereupon the control valve is reversed to relocate the auxiliary pointer at scale capacity, and then again reversed to effect clutched connection of the auxiliary pointer to the indicator shaft. The operation is repeated for each succeeding amount removed, the auxiliary pointer showing in each case when the desired net weight of the material has been removed.

If in the foregoing example of weighing-out it is desired to effect automatic cut-off of material removal at a given net weight, the embodiment of FIGS. 6 to 9 may be employed. The only apparatus change requirement would be the reversal of air motor nozzle position so as to effect auxiliary pointer return to the scale capacity point and arrangement of the feeder valve 142 so that it controls material discharge from the container. Obviously upon setting the cut-off arm 118, when the auxiliary pointer reaches that setting in its down-scale movement, the valve 132 will be closed and the auxiliary pointer returned to scale capacity.

The present invention affords relatively simple yet effective indicator mechanism as illustrated and now described, suitable for use in weighing apparatus to adapt the same for various weighing functions including container filling operations. Importantly, the improved mechanism affords pneumatically operated clutch means for scale drive connection of the auxiliary pointer, which is of improved character to avoid frictional drag on the indicator, and further affords pneumatic turbine means for independent return of the auxiliary pointer to initial dial position, all as herein disclosed. Having described the invention and the various features thereof, it is to be understood that the same may be modified in various respects without departing from the spirit and scope of the invention as hereinafter claimed.

I claim:

1. Indicator mechanism of the character disclosed, comprising a rotatable indicator shaft, a first indicator fixed on the shaft, a second indicator rotatable on the shaft, fluid pressure operated clutch means mounted on the shaft for rotation therewith and effective in response to fluid pressure, to connect said second indicator to the shaft, and means for supplying fluid under pressure to the clutch means, said means including a passageway in the shaft communicating with said clutch means and terminating in a port in one end of the shaft, and a fluid pressure delivery nozzle in spaced relation to said port.

2. Indicator mechanism of the character disclosed, comprising a rotatable indicator shaft, a first indicator fixed on the shaft, a second indicator rotatable on the shaft, fluid pressure operated clutch means mounted on the shaft for rotation therewith and effective in response to fluid pressure, to connect said second indicator to the shaft, and means for supplying fluid under pressure to the clutch means, said means including a passageway in the shaft communicating with said clutch means and terminating in a port in one end of the shaft, and a fluid pressure delivery nozzle arranged to have its discharge tip opposed to said port and spaced from said one end of the shaft by a predetermined minimum distance.

3. Indicator mechanism according to claim 2 wherein the said predetermined minimum distance is of the order of .01 inch.

4. Indicator mechanism of the character disclosed, comprising a rotatable indicator shaft, a first indicator fixed on the shaft, a second indicator having a hub rotatably mounted on the shaft, fluid pressure operated clutch means on the shaft and operable in response to fluid pressure, to connect said hub to the shaft for shaft rotation of the second indicator, a passageway in the shaft communicating with said clutch means and terminating in a port in one end of the shaft, a first fluid pressure delivery nozzle in spaced opposed relation to said port, blade elements on said hub, a second fluid pressure delivery nozzle arranged to deliver fluid pressure against said hub blades for causing rotation of the hub and second indicator in one direction, and supply means for supplying fluid pressure selectively to said first and second delivery nozzles.

5. Indicator mechanism for weighing scales, comprising a rotary shaft, a fixed dial coaxial with the shaft, a dial pointer on the shaft, a fluid pressure operated clutch means including a first member fixed on said rotary shift and a second member rotatably supported on the shaft, an auxiliary dial pointer on said second member, said clutch means in operation providing for shaft drive of said auxiliary pointer, fluid pressure operated motor means for moving said second member and auxiliary pointer to an initial position of the latter relative to said dial, and fluid pressure supply means including control valve means, effective in one control condition of the valve means for supplying fluid pressure to said clutch means for operation thereof, and in another control condition of the valve means to supply fluid pressure to said motor means.

6. Indicator mechanism of the character disclosed, comprising an indicator frame, a shaft rotatably carried by the frame, a dial on the frame, a dial pointer fixed on the shaft for movement thereby over said dial, fluid pressure operated clutch means including a first clutch member fixed on said shaft and a second clutch member having a circular hub portion rotatably supported on the shaft, an auxiliary dial pointer carried by said second clutch member, said first and second clutch members in relative engagement upon fluid pressure operation of the clutch means, connecting the auxiliary pointer to the shaft for movement therewith, a bracket on said dial, a fluid pressure discharge nozzle carried by the bracket and extending adjacent said hub portion in position for directing fluid pressure delivery substantially tangentially against said hub portion to return and constrain said second member and auxiliary pointer to an initial position of the latter relative to the dial, and fluid pressure supply means connected to said clutch means and nozzle, said supply means including control valve means for controlling fluid pressure supply selectively and in the alternative to the nozzle and clutch means.

7. Indicator mechanism of the character disclosed, comprising an indicator frame, a shaft rotatably carried by the frame, a dial on the frame, a dial pointer fixed to the shaft for movement thereby over the dial; a disc member having a circular hub portion rotatably supported on the shaft, an auxiliary dial pointer on said disc member, clutching means fixed on said shaft and cooperable with said disc member to connect the latter to the shaft for shaft turning of said auxiliary pointer, said clutching means providing a fluid pressure chamber including a chamber-defining diaphragm movable by fluid pressure to clutching engagement with said disc member, said shaft having an axial passage therein communicating with said chamber of the clutching means and terminating in a port-opening at one end of the shaft, a fluid pressure delivery nozzle mounted adjacent said end of the shaft with the nozzle opening opposed to said passage port-opening for directing fluid pressure thereinto and through said passage to said chamber for clutching actuation of said diaphragm, a second fluid pressure delivery nozzle mounted adjacent said circular hub portion and directed substantially tangentially relative to the hub portion for delivery of fluid pressure thereagainst to return and constrain said disc member and auxiliary pointer to an initial position of the latter relative to the dial, and fluid pressure supply means in connection to said nozzles, including control means for determining supply of fluid pressure selectively to the nozzles.

8. Indicator mechanism of the character disclosed, comprising an indicator frame, a shaft rotatably carried on the frame, a dial on the frame, a dial pointer fixed to the shaft for movement thereby over the dial; a disc member rotatably journalled on the shaft, an auxiliary dial pointer carried by said disc member, fluid pressure actuated clutching means fixed on said shaft and cooperable with the disc member to connect the latter to the shaft for shaft turning of said auxiliary pointer, said clutching means providing a fluid pressure chamber including a chamber-defining diaphragm opposed to said disc member and movable by fluid pressure to clutching engagement with the disc member, said shaft having an axial passage therein communicating with said fluid pressure chamber and terminating in a port-opening in one end of the shaft, a fluid pressure delivery nozzle mounted adjacent said end of the shaft with the nozzle tip opening opposed to said passage port-opening and with the nozzle tip in predetermined minimum out-of-contact spacing relative to the shaft end, and fluid pressure supply means connected to said nozzle and including control means for determining delivery and non-delivery of fluid pressure to the nozzle.

9. Indicator mechanism as defined by claim 8, wherein the said predetermined minimum out-of-contact spacing of the said nozzle tip relative to the shaft end, is of the order of .01 inch.

10. In an indicator of the character disclosed, an indicia bearing dial, a rotatable shaft, a first indicator on said shaft for movement relative to the dial, a second indicator selectively connectable to said shaft for conjoint movement with the first indicator relative to the dial, and fluid pressure operated turbine motor means including a turbine rotor operatively associated with said second indicator, said turbine motor means being effective in disconnection of the second indicator from the shaft, for causing movement of the second indicator to a given position relative to the dial.

11. Indicator mechanism of the character disclosed, comprising an indicator frame, a shaft rotatably carried on the frame, a dial on the frame, a dial pointer fixed on the shaft for movement thereby over the dial, a member having a circular hub rotatably mounted on said shaft, an auxiliary dial pointer on said member, clutching means fixed on said shaft and operable from an inactive condition to connect said member and auxiliary pointer to the shaft for shaft turning of the auxiliary pointer, a fluid pressure delivery nozzle mounted adjacent said hub in position to direct fluid pressure substantially tangentially against the circular hub for causing rotation of said member in the direction to move the auxiliary pointer toward and to an initial position relative to the dial, a fluid pressure supply line connected to said nozzle, and control means for controlling operation of said clutching means and supply of fluid pressure through said supply line to said nozzle.

12. Indicator mechanism of the character disclosed, comprising a frame, a shaft rotatably carried by the frame, a dial on the frame, a dial pointer fixed on the shaft for movement thereby over the dial, a member having a hub rotatably journalled on the shaft, an auxiliary dial pointer on said member, clutch means operable from an inactive condition to a condition connecting said member to the shaft for shaft turning of said auxiliary dial pointer, and motor means effective in the inactive condition of said clutch means for rotating said member and auxiliary pointer toward and to an initial position of the auxiliary pointer relative to the dial, said motor means comprising spaced projections on the periphery of said hub, a fluid pressure delivery nozzle mounted adjacent the hub and positioned to direct fluid pressure delivery tangentially of the hub against said hub projections, and fluid pressure supply means connected to said nozzle.

References Cited by the Applicant

UNITED STATES PATENTS

| | | | |
|---|---|---|---|
| 1,363,913 | 12/1920 | Pearson | 58—146 |
| 1,409,317 | 3/1922 | Thomas | 177—166 |
| 2,605,736 | 8/1952 | Cook et al. | 116—129 |
| 2,688,301 | 9/1954 | Brown | 177—166 X |
| 2,717,573 | 9/1955 | Murray | 116—129 |
| 2,768,946 | 10/1956 | Filippi et al. | 177—166 |
| 2,883,140 | 4/1959 | Stafford | 177—68 |
| 2,925,983 | 2/1960 | Kennaway et al. | 177—68 |
| 2,941,498 | 6/1960 | Teter | 116—129 |

FOREIGN PATENTS

| | | |
|---|---|---|
| 827,087 | 1/1938 | France. |
| 876,940 | 9/1961 | Great Britain. |
| 894,115 | 4/1962 | Great Britain. |
| 609,682 | 9/1960 | Italy. |

LEO SMILOW, *Primary Examiner.*

G. J. PORTER, *Assistant Examiner.*